United States Patent
Tommasi et al.

(10) Patent No.: US 11,340,895 B2
(45) Date of Patent: May 24, 2022

(54) AUTOMATIC GENERATION OF LOGICALLY CONSISTENT APPLICATION CODE CHANGE GROUPS

(71) Applicant: INTERNATIONAL BUSINESS MACHINES CORPORATION, Armonk, NY (US)

(72) Inventors: Pierpaolo Tommasi, Dublin (IE); Valentina Rho, Dublin (IE); Theodora Brisimi, Dublin (IE); Martin Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 16/541,778

(22) Filed: Aug. 15, 2019

(65) Prior Publication Data
US 2021/0049006 A1    Feb. 18, 2021

(51) Int. Cl.
| | |
|---|---|
| *G06F 8/71* | (2018.01) |
| *G06F 9/445* | (2018.01) |
| *G06F 8/75* | (2018.01) |
| *G06N 20/00* | (2019.01) |
| *G06K 9/62* | (2022.01) |

(52) U.S. Cl.
CPC .................. *G06F 8/71* (2013.01); *G06F 8/75* (2013.01); *G06F 9/44505* (2013.01); *G06K 9/6263* (2013.01); *G06N 20/00* (2019.01)

(58) Field of Classification Search
CPC .......... G06F 8/71; G06F 8/75; G06F 9/44505; G06N 20/00; G06K 9/6263
See application file for complete search history.

(56) References Cited

U.S. PATENT DOCUMENTS

| | | |
|---|---|---|
| 6,981,250 B1 | 12/2005 | Wiltamuth et al. |
| 7,788,640 B2 | 8/2010 | Grimaldi |
| 8,341,600 B2 | 12/2012 | Sutherland et al. |
| 8,377,652 B2 | 2/2013 | Holler |
| 10,949,391 B2* | 3/2021 | Hiekata ............ G06F 16/24578 |
| 2009/0133006 A1 | 5/2009 | Cheung |
| 2012/0210298 A1 | 8/2012 | Hodgins et al. |
| 2017/0262360 A1 | 9/2017 | Kochura et al. |
| 2018/0189055 A1* | 7/2018 | Dasgupta ............ G06F 11/3608 |
| 2019/0026106 A1 | 1/2019 | Burton et al. |
| 2019/0155722 A1* | 5/2019 | Gupta .................. G06F 11/008 |
| 2020/0104121 A1* | 4/2020 | Morgan .................... G06F 8/71 |

(Continued)

OTHER PUBLICATIONS

Jumpei Matsuda et al., "Hierarchical categorization of edit operations for separately committing large refactoring results," 2015 [retrieved on Jul. 3, 2021], IWPSE 2015: Proceedings of the 14th International Workshop on Principles of Software Evolution, pp. 19-27, downloaded from <url>:https://dl.acm.org. (Year: 2015).*

(Continued)

*Primary Examiner* — S. Sough
*Assistant Examiner* — Stephen D Berman
(74) *Attorney, Agent, or Firm* — Griffiths & Seaton PLLC

(57) ABSTRACT

Embodiments for intelligent application development by a processor. One or more application code changes may be automatically into one or more application code change groups for a versioning system, wherein the one or more application code groups are logically consistent and self-contained.

17 Claims, 8 Drawing Sheets

(56) References Cited

U.S. PATENT DOCUMENTS

2020/0159525 A1* 5/2020 Bhalla .................. G06N 5/02
2021/0019383 A1* 1/2021 Huang .................. G06F 21/44

OTHER PUBLICATIONS

Martin Dias et al., "Untangling fine-grained code changes," 2015 [retrieved on Nov. 4, 2021], 2015 IEEE 22nd International Conference on Software Analysis, Evolution, and Reengineering, pp. 341-350, downloaded from <url>:https://ieeexplore.ieee.org. (Year: 2015).*

Marcel Taeumel et al. "Unravel Programming Sessions with THRESHER: Identifying Coherent and Complete Sets of Fine-granular Source Code Changes," 2017 [retrieved on Nov. 4, 2021], Information and Media Technologies 12:24-39, pp. 24-39, downloaded from <url>:https://www.jstage.jst.go.jp. (Year: 2017).*

Shinpei Hayashi et al., "Historef: A tool for edit history refactoring," 2015 [retrieved on Nov. 4, 2021], IEEE 22nd International Conference on Software Analysis, Evolution, and Reengineering, pp. 469-473, downloaded from <url>:https://ieeexplore.ieee.org. (Year: 2015).*

Martin Konopka et al., "Untangling Development Tasks with Software Developer's Activity," 2015 [retrieved on Nov. 4, 2021], 2015 IEEE/ACM 2nd International Workshop on Context for Software Development, pp. 13-14, downloaded from <url>:https://ieeexplore.ieee.org. (Year: 2015).*

M. Linares-Vásquez, L. F. Cortés-Coy, J. Aponte and D. Poshyvanyk, "ChangeScribe: A Tool for Automatically Generating Commit Messages," 2015 IEEE/ACM 37th IEEE International Conference on Software Engineering, Florence, 2015, pp. 709-712.

Liu et al., "Neural-Machine-Translation-Based Commit Message Generation:How Far Are We?", ASE '18, Sep. 3-7, 2018, Montpellier, France. (12 Pages).

Jiang et al, "Automatically Generating Commit Messages from Diffs Using Neural Machine Translation." arXiv:1708.09492v1 [cs.SE] Aug. 30, 2017. (12 Pages).

A. Alali, H. Kagdi and J. I. Maletic, "What's a Typical Commit? A Characterization of Open Source Software Repositories," 2008 16th IEEE International Conference on Program Comprehension, Amsterdam, 2008, pp. 182-191.

B. Fluri, M. Wursch and H. C. Gall, "Do Code and Comments Co-Evolve? On the Relation between Source Code and Comment Changes," 14th Working Conference on Reverse Engineering (WCRE 2007), Vancouver, BC, 2007, pp. 70-79.

L. F. Cortés-Coy, M. Linares-Vásquez, J. Aponte and D. Poshyvanyk, "On Automatically Generating Commit Messages via Summarization of Source Code Changes," 2014 IEEE 14th International Working Conference on Source Code Analysis and Manipulation, Victoria, BC, 2014, pp. 275-284.

Eddie Antonio Santos and Abram Hindle. 2016. Judging a commit by its cover: correlating commit message entropy with build status on travis-CI. In Proceedings of the 13th International Conference on Mining Software Repositories (MSR '16). ACM, New York, NY, USA, 504-507.

"Summarizing Evolutionary Trajectory by Grouping and Aggregating Relevant Code Changes" Qingtao Jiang et al. Accepted for publication by IEEE. c 2015 IEEE (pp. 361-370).

"RCLinker: Automated Linking of Issue Reports and Commits Leveraging Rich Contextual Information" Tien-Duy B. Le et al. 2015 IEEE 23rd International Conference on Program Comprehension ( 13 Pages ).

* cited by examiner

US 11,340,895 B2

AUTOMATIC GENERATION OF LOGICALLY CONSISTENT APPLICATION CODE CHANGE GROUPS

BACKGROUND OF THE INVENTION

Field of the Invention

The present invention relates in general to computing systems, and more particularly to, various embodiments for automatically generating logically consistent application code change groups by a processor.

Description of the Related Art

Computing systems may be found in the workplace, at home, or at school. Processing devices, with the advent and further miniaturization of integrated circuits, have made it possible to be integrated into a wide variety of devices. In recent years, both software and hardware technologies have experienced amazing advancement. With the new technology, more and more functions are added, and greater convenience is provided for use with these computing systems.

SUMMARY OF THE INVENTION

Various embodiments for intelligent application development by a processor, are provided. In one embodiment, by way of example only, a method for automatically generating logically consistent application code change groups, again by a processor, is provided. One or more application code changes may be automatically into one or more application code change groups for a versioning system, wherein the one or more application code groups are logically consistent and self-contained.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
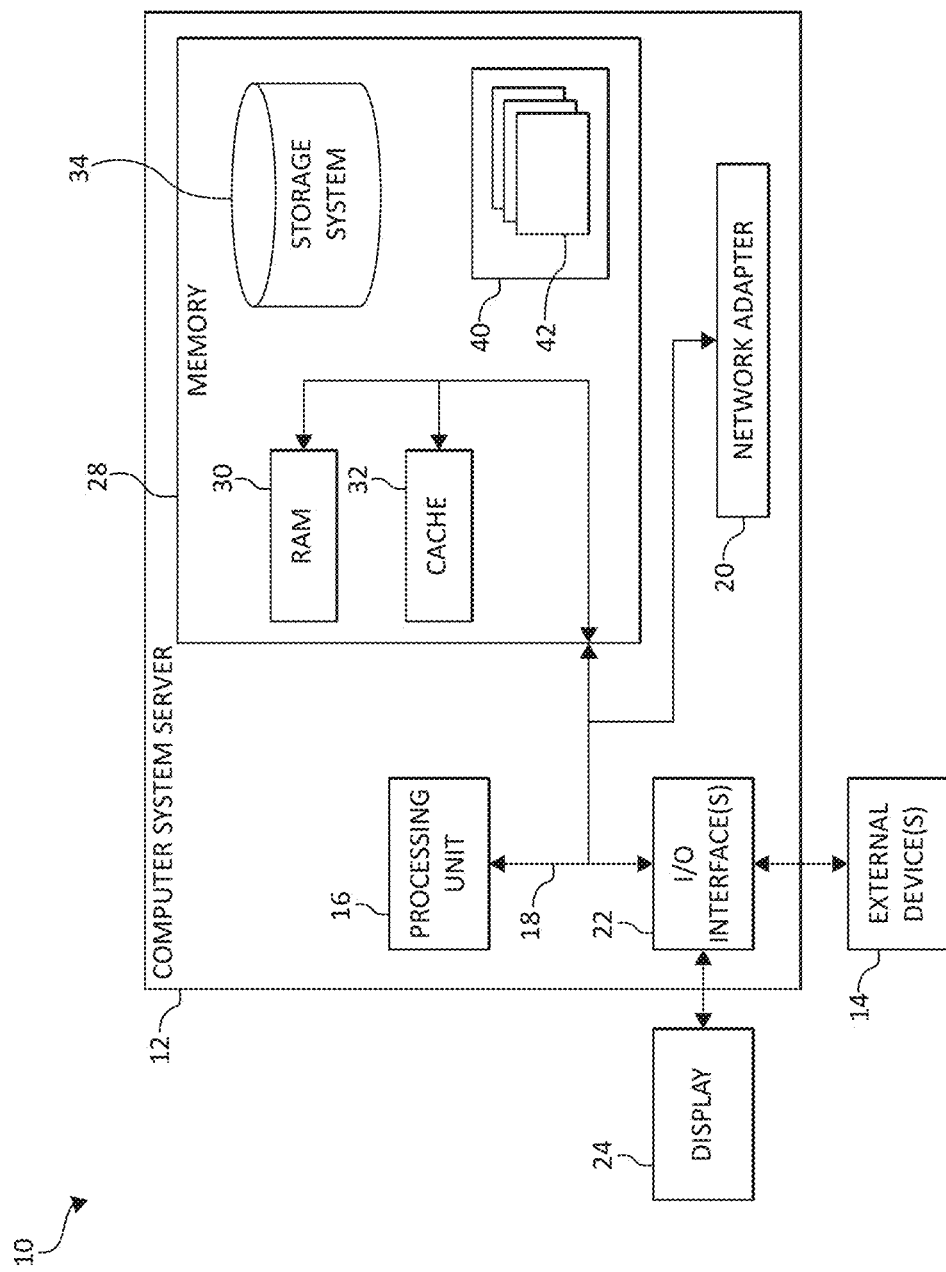
FIG. 1 is a block diagram depicting an exemplary cloud computing node according to an embodiment of the present invention.

As a preliminary matter, the term "code" as used herein may refer to all files related to an executable application. For example, code may be executable software itself (e.g., source or object code) as well as various files used by the executable code such as images, documentation, etc. Typically, software development environments can be used to implement software during its development. Many components of new software can be developed over a period of time. A software development project can have a life cycle which uses resources within an organization. In the software development context, keeping a clean history of changes in the code base can significantly speed up the development, rollback and review process. There are many guidelines and utilities that can support the developer in this task, but the responsibility of following them in the expected way and at the proper time is the sole responsibility of the developer.

It is understood that when developing software or "code," software developers may break up the development process in units or code units committed piecemeal (also referred to as 'commits') throughout the life of the project. Said differently, software code (e.g., application code) may be developed by software programmers during a software development stage. Then, the code may then be "committed" which means that the software developer may release the code for testing. A "software commit" (or simply "commit") may refer to code that has been written by a software developer, but has not yet been inserted into a production environment. After fixing any bugs and each piece of code is tested, the code may then be released into production. A full cycle of testing for every commit (e.g., each unit of the software) may be administered. In some cases, time and availability of resources (e.g., physical hardware or virtual machines or hosts) can lead to reduced testing.

However, challenges occur when a software developer makes changes to piece of code at various points in time and at various locations within the code. The software developer is challenged with the daunting task to remember each point and moment that a code change is made along with providing a list of all code changes in a logically, consistent manner.

Accordingly, a need exist for automatically generating logically consistent application code change groups that may be included in one or more commits. In one aspect, the present invention provides various embodiments that track each application code change occurring during the selected time period. Each application code change may be automatically grouped into one or more application code change groups for a versioning system. The application code groups may be logically consistent and self-contained. Each of the application code change groups may be linked to an existing software issue and/or a new software issue. The one or more application code changes may be combined with metadata describing each application change. A list of the one or more application code change groups having the metadata associated therewith may be provided.

Thus, the present invention may automatically select a logically consistent and self-contained group of changes to be submitted together and provides a complete and concise message to describe each code change. Each commit that includes one or more code change may be linked to a new or existing issue. Thus, the present invention eliminates the requirement of a software developer stopping at the right moment to submit a set of changes, before, for example, starting a new task or fixing a non-related bug that has just been identified. Also, the present invention eliminates premature submission of code changes all together and resulting in a non-clean history and increasing the difficulty in a code review task.

Accordingly, various embodiments are provided herein for automatically grouping code changes even if the changes do not occur subsequently in time (e.g., code changes occurring at random time periods and being out of sequences).

In an additional embodiment, each code group may be automatically linked to an existing issue in an issue tracking system or prompts a user to create a new issues if no related one is found. The present invention may use the issue's description that is linked to the code group to generate a message to be associated with the code group/commit.

In one aspect, user feedback may be obtained pertaining to one or more code groups and using the feedback to improve and/or personalize code group change results. Moreover, user feedback pertaining to one or more messages associated with one or more code groups may also be obtained to improve and/or personalize code group change results.

The mechanisms of the illustrated embodiments may display logically consistent application code change groups on an interactive graphical user interface ("GUI") as a visual representation of the application code change groups. The visual representation of the application code change groups may a) enable users accept, reject, and/or modify the application code change groups, b) provide feedback data as to whether the application code change groups information was correctly identified or not or simply to help the user understand the application code change groups, etc., and/or c) collect feedback data pertaining to application code change group messages. Other examples of various aspects of the illustrated embodiments, and corresponding benefits, will be described further herein.

In one aspect, as used herein, a group may be a subset of a commit. In an additional aspect, a group may be a logical grouping of a plurality of code changes that may occur over a selected period of time (but not necessarily in a sequential order during code development). In one aspect, a group may be divided into multiple smaller groups of one or more code changes. Alternatively, a group may be a collection of a plurality of smaller groups of one or more code changes. A commit may be one or more groups. For example, a commit may be a single commit that may include one or more groups (that contain one or more changes) and the commit may be submitted at the end of a selected time period where the one or more groups that include one or more changes).

Thus, the present invention facilitates the developer to maintain a clean commit history, which also helps the code reviewer and speeds up the review process. The developer can have an uninterrupted work flow during a selected period of time and commit the changes only at the end of the day while improving performance in terms of number of completed tasks. It should be noted that the present invention is valuable both in a scenario whether or not an issue tracking system is used by the development team.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
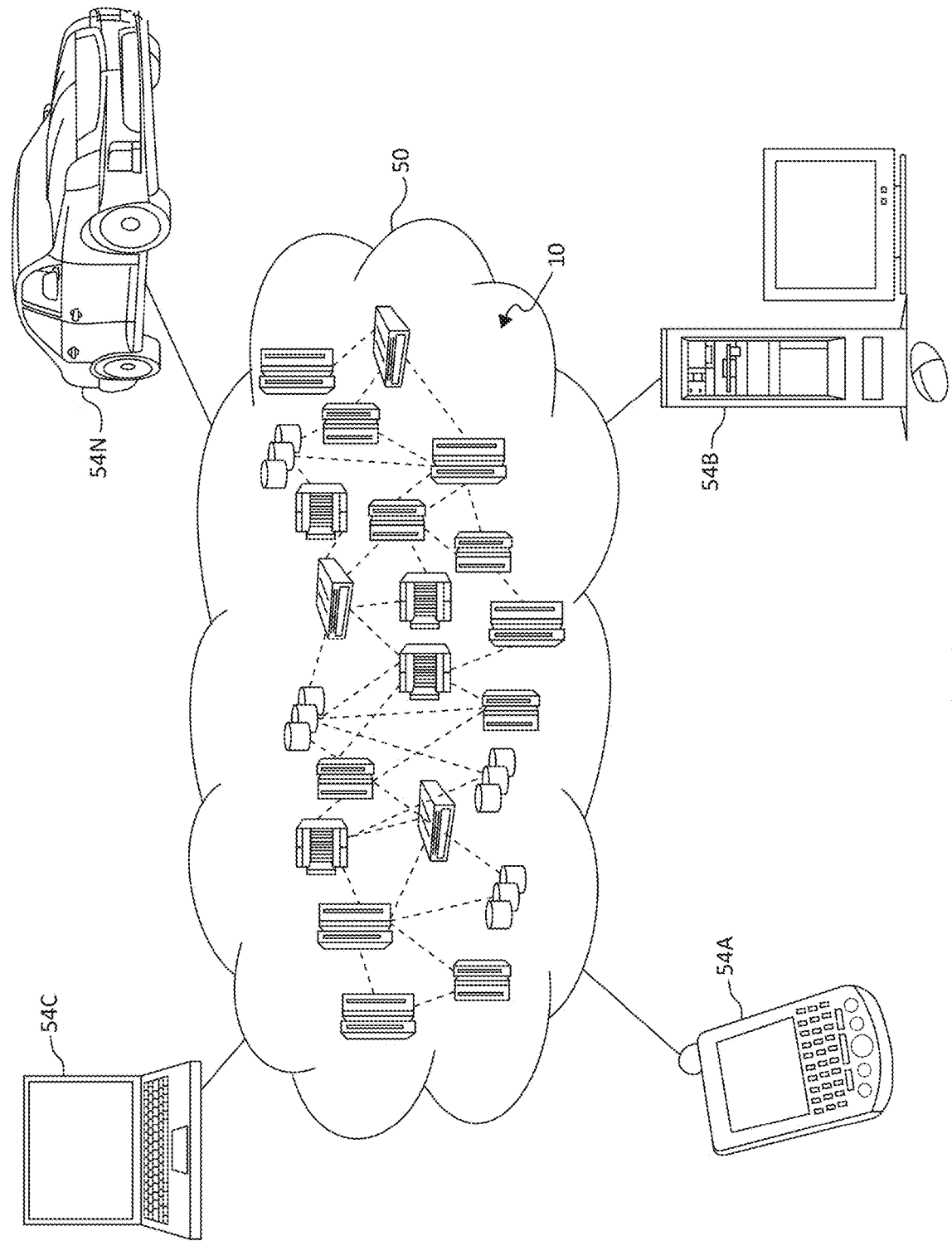
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
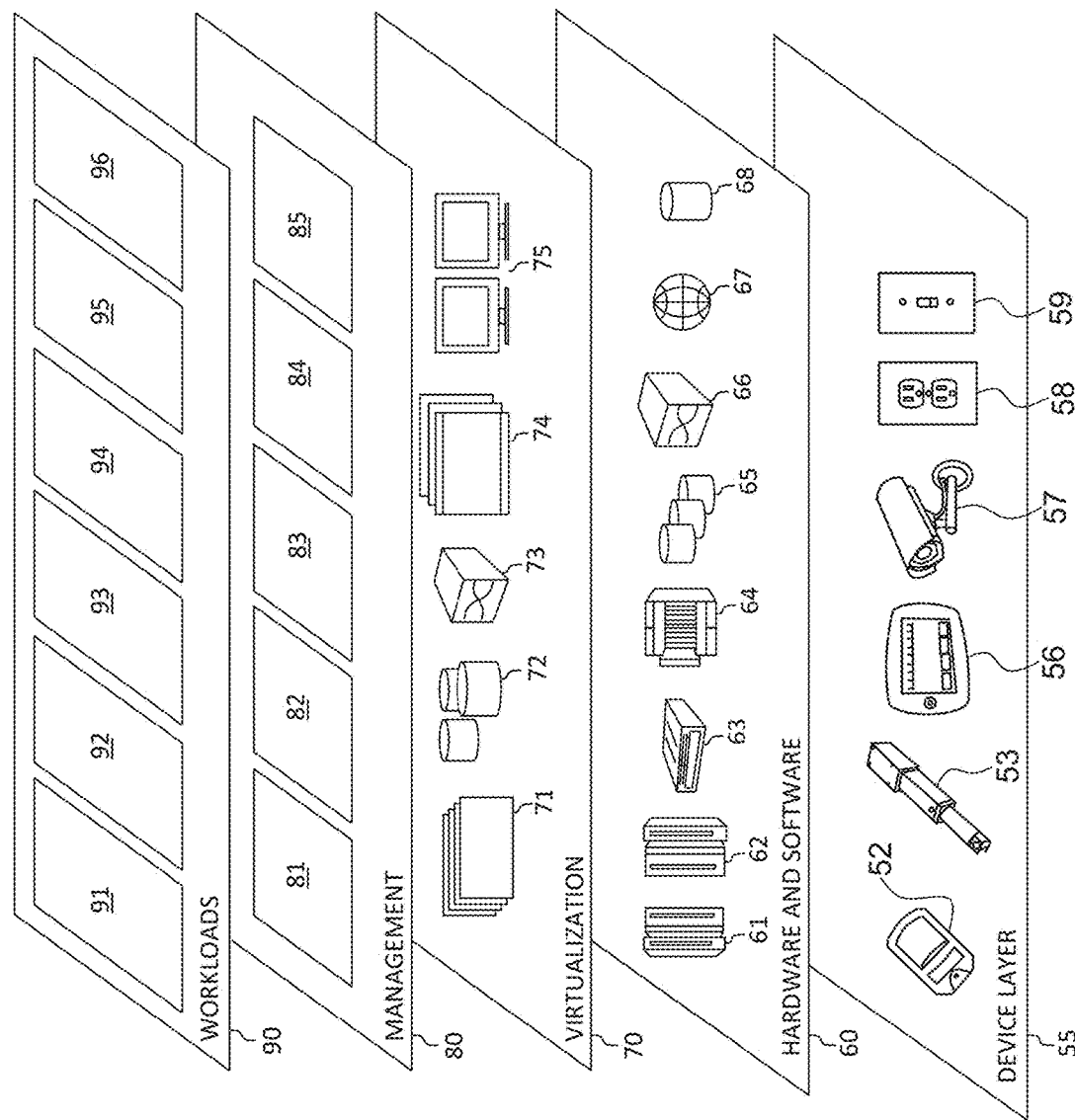
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automatic generation of logically consistent application code change groups. In addition, workloads and functions 96 for automatic generation of logically consistent application code change groups may include such operations as data analytics, data analysis, and as will be further described, notification functionality. One of ordinary skill in the art will appreciate that the workloads and functions 96 for automatic generation of logically consistent application code change groups may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for automatically generating logically consistent application code change groups thereby enabling a software developer to improve the quality of their commits in terms of consistency and clarity, without having to actively remember to pause the development flow of software development to submit a portion of the changes that needs to be done.

The present invention may automatically group code changes to generate logically consistent/self-contained commits for a versioning system, where each generated group/commit may be followed by a suggested link to a related issue from an issue tracking system or with a suggestion for the creation of a new issue, if the group/commit cannot be associated with already existing issues. A user interface may display the suggested groups/commits, and enable a user/developer to provide feedback on the groups of code changes. The feedback is used to improve and/or personalize the results of the system (recommended groups).

The present invention enables software developers to complete their work task and upon conclusion of all work tasks, the software developer may create and submit grouped code changes (even if they are not subsequent in time). By exploiting the users' interactions/feedback, the present invention may use machine learning to improve software change groupings and corresponding messages. Specifically, the present invention may: 1) automatically group code changes even if the code change do not occur subsequently in time, 2) capture user feedback about code groups and use the feedback to improve and/or personalize the application code groups and/or development results, 3) capture user feedback about messages associated with code groups and use the feedback to improve and/or personalize the application code groups and/or development results, 4) automatically link each code group to an existing issue in an issue tracking system or prompts the user to create a new issues if no related one is found, and/or 5) use a description of an issue that is linked to the code group to generate message to be associated with the code group/commit.

Figure 4:
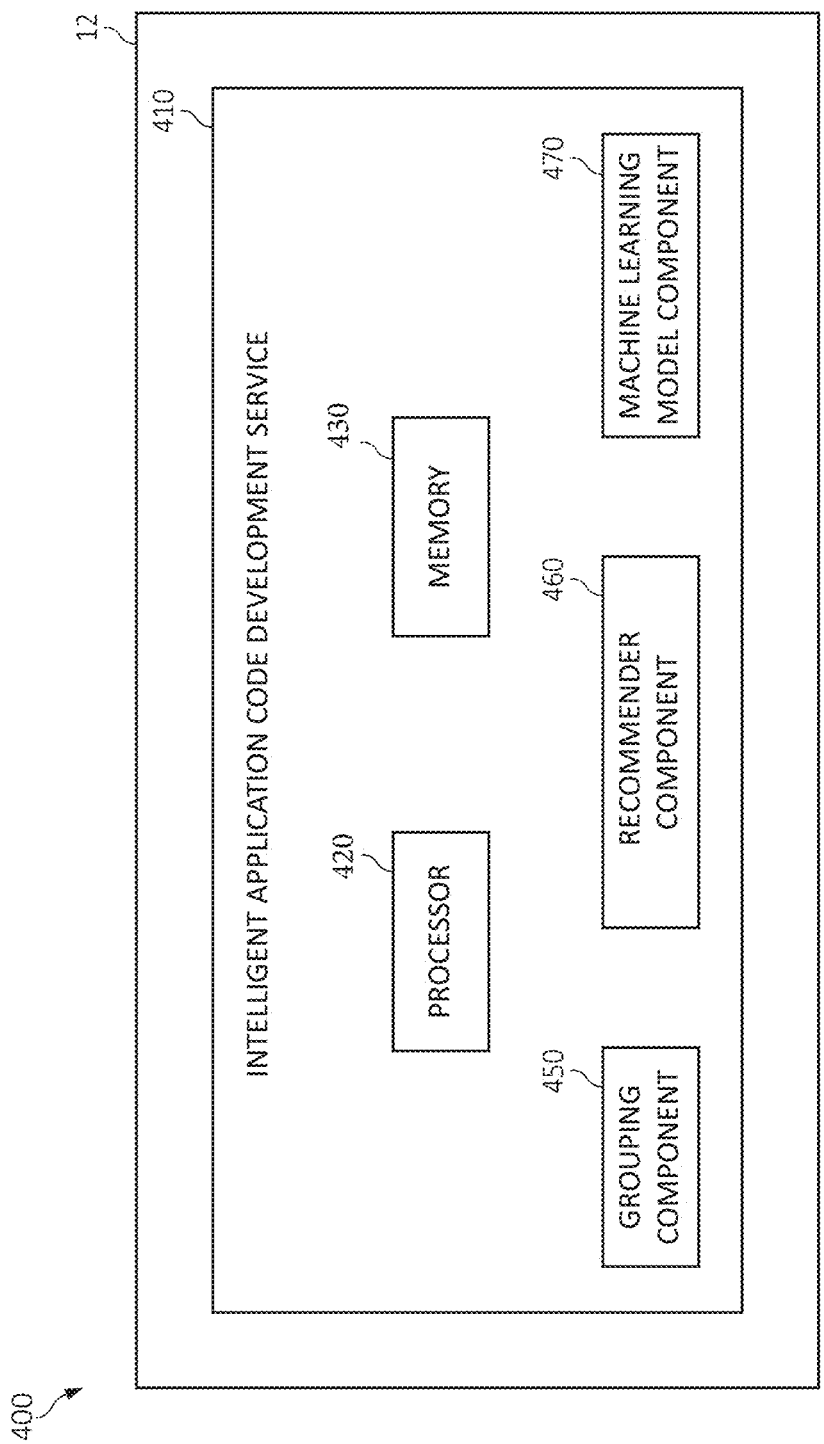
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent application code development service 410 is shown, incorporating processing unit ("processor") 420 to perform various computational, data processing and other functionality in accordance with various aspects of the present invention. The intelligent application code development service 410 may be provided by the computer system/server 12 of FIG. 1. The processing unit 420 may be in communication with memory 430. The intelligent application code development service 410 may also include a grouping component 450, a recommender component 460, and a machine learning model component 470.

As one of ordinary skill in the art will appreciate, the depiction of the various functional units in the intelligent application code development service 410 is for purposes of illustration, as the functional units may be located within the intelligent application code development service 410 or elsewhere within and/or between distributed computing components.

In one aspect, the computer system/server 12 and/or the intelligent application code development service 410 may provide virtualized computing services (i.e., virtualized computing, virtualized storage, virtualized networking, etc.). More specifically, the intelligent application code development service 410 may provide, and/or be included in, a virtualized computing, virtualized storage, virtualized networking and other virtualized services that are executing on a hardware substrate.

In one aspect, the grouping component 450 may automatically group one or more application code changes into one or more application code change groups for a versioning system and the application code groups are logically consistent and self-contained.

The grouping component 450 may track the one or more application code changes occurring during the selected time period. Also, the grouping component 450 may automatically link each of the application code change groups to an existing issue or automatically link each of the application code change groups to a new issue. The grouping component 450 may combine the one or more application code changes with metadata describing each application change.

The recommender component 460 may provide a list of the one or more application code change groups having the metadata associated therewith. The recommender component 460 may generate a message that describes the one or more application code change groups relating to an issue.

In an additional aspect, the machine learning model component 470 may collect feedback data on the one or more application code change groups relating to the message. That is, the machine learning model component 470 may initialize a machine learning mechanism to: 1) collect feedback data from a user, 2) suggest the one or more application code change groups to a user for acceptance, denial, or modification, and/or 3) learn to automatically group one or more application code changes into one or more application code change groups according to feedback data.

In one embodiment, by way of example only, the machine learning component 470 as used herein may include, for example, an instance of IBM® Watson® such as Watson® Analytics (IBM® and Watson® are trademarks of International Business Machines Corporation). By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
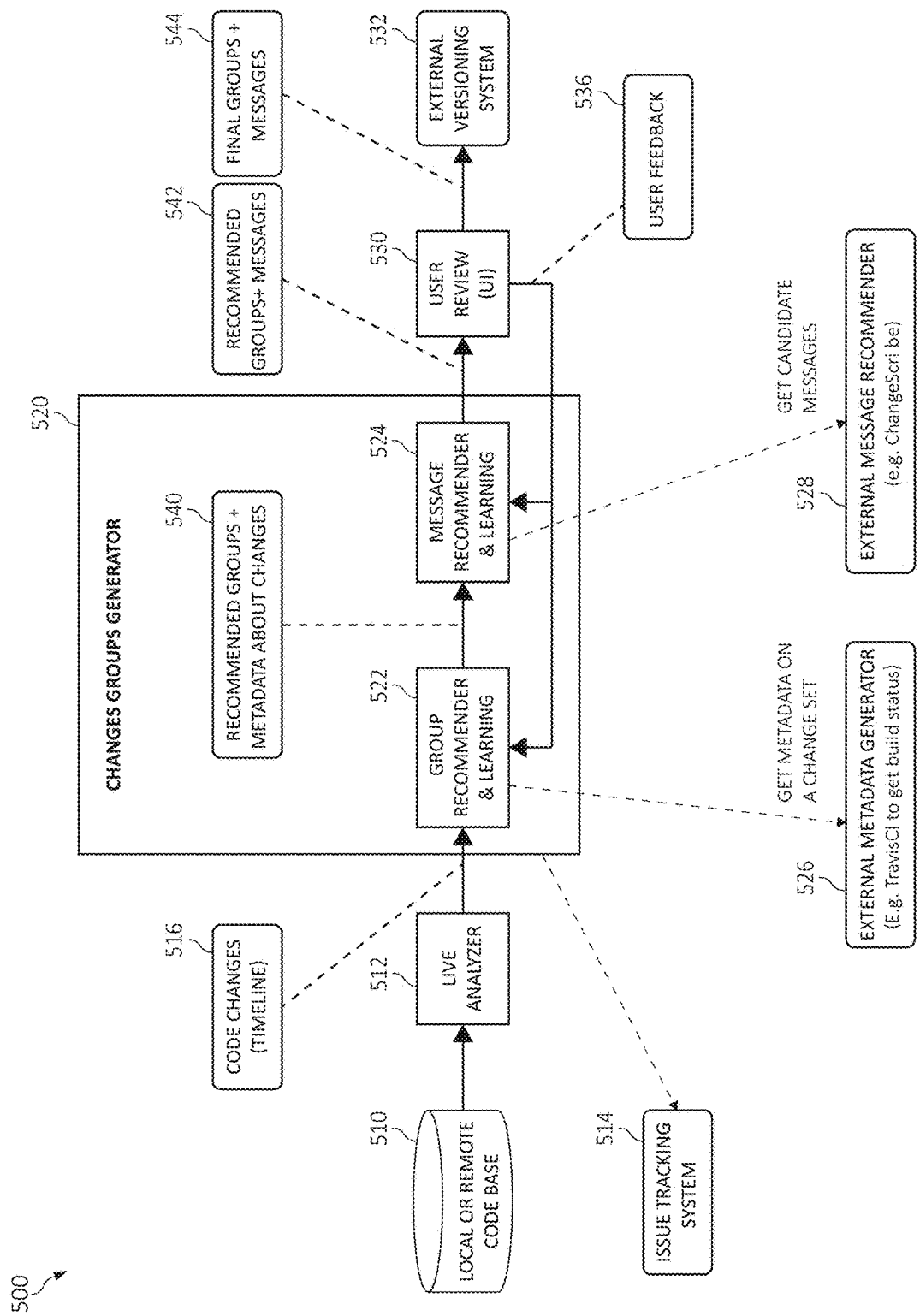
FIG. 5 is a diagram depicting operations for automatically generating logically consistent application code change groups in accordance with aspects of the present invention.

Turning now to FIG. 5, a block diagram of exemplary functionality 500 relating to automatic generation of logically consistent application code change groups is depicted. As shown, the various blocks of functionality are depicted with arrows designating the blocks' 500 relationships with each other and to show process flow. Additionally, descriptive information is also seen relating each of the functional blocks 500. With the foregoing in mind, the module blocks 500 may also be incorporated into various hardware and software components of a system for transaction interaction analysis and summarization methods and features in accordance with the present invention, such as those described in FIGS. 1-4. Many of the functional blocks 500 may execute as background processes on various components, either in distributed computing components, or on the user device, or elsewhere.

Starting in block 510, a local folder (or remote code base) where the code is stored may be input into a live analyzer 512. The live analyzer 512 may process the code and provide (to the group recommender and learning component 522 that may be included in a change group generator 520 that also includes a message group recommender and learning component 524) a timeline of changes (e.g., code changes timeline 516) made on the code base. In one aspect, the live analyzer 512 may monitor the local code base for changes (e.g., by monitoring a file system and listening for changes in the project folder. The live analyzer 512 may process the code and provide (to block 522) a timeline of changes made on the code base. The live analyzer 512 may include a local timeline of all code changes (e.g., if a file is saved twice, although not committed, the live analyzer 512 may maintain the code change history). In one aspect, the live analyzer 512 may use a versioning system (e.g., a distributed version-control system for tracking changes in source code during software development) and submit (locally) a temporary commit every amount of time or every time a file is saved.

The group recommender and learning component 522 (e.g., code change set learning) may receive the timeline of changes performed from the last confirmed commit from the live analyzer 512. Additionally, the group recommender and learning component 522 may receive a list of issues from the issues tracking system. In another aspect, the group recommender and learning component 522 may receive metadata about a code change set that may be externally generated such as, for example, external metadata generated from an external metadata generator 526 (e.g., a continuous integration services used to build and test software projects, which may be hosted for software development version control).

The group recommender and learning component 522 may provide (to a message recommender and learning component 524) a list of recommended changes groups with metadata describing the code changes and may provide, for each code change group, a link to an existing issue from an issue tracking system 514. In one aspect, if there are no relevant issues found, the group recommender and learning component 522 may prompt a user 530 (e.g., user review via a user interface "UI") to open a new issue.

In an additional aspect, the group recommender and learning component 522 may process the code changes on the timeline and combines the code changes with metadata about the code changes (which may be externally or internally generated in the group recommender and learning component 522) in order to group the code changes in one or more logically consistent/self-contained groups. The group recommender and learning component 522 may accept the user feedback from the user 530 (e.g., user review via a user interface "UI") to improve the grouping strategy and/or learn the user preferences (e.g., size of the group, learning relationship among components to be grouped altogether). In another aspect, the group recommender and learning component 522 may link a code change set to an issue currently in progress or may link a code change set to an open issue open but not yet in progress. If the group recommender and learning component 522 fails to identify any related issue (e.g., software issue), the group recommender and learning component 522 may suggest to the user 530 to open a new issue to track the specific changes set.

In an additional embodiment, the group recommender and learning component 522 may use metadata describing the change set that are created 1) externally (e.g., by a continuous integration system to detect that the change set doesn't break the code base) or 2) internally (e.g., by using a pre-trained machine learning model that identifies the type of the change associated with the change set (rename, add method, move files, etc.).

The group recommender and learning component 522 may create one or more suggested groups such as, for example, by clustering changes based on the generated metadata. The group recommender and learning component 522 may use feedback from the user 530 in order to re-train a clustering operation/algorithm that generates the suggested groups. The group recommender and learning component 522 may determine/calculate a similarity score between each issue and the metadata describing each of the code change sets. If the similarity score is below a selected/predefined threshold, the group recommender and learning component 522 may prompt the user 530 to open a new issue. If the similarity score is above the threshold, the group recommender and learning component 522 may link the code change set to the issue with the highest score. The similarity score may be implemented by extracting entities of interest from the title and description of the issue and the metadata describing the change set. In an additional embodiment, the similarity score may be determined/calculated as the overlapping set size between these two sets.

The message recommender and learning component 524 may receive as input the recommended code change groups and metadata describing each of the code changes. In an additional aspect, the message recommender and learning component 524 may receive the linked issue coming from an issue tracking system 514 and/or an externally generated message, which may be generated from an external message recommender 528 (e.g., external message recommender that provides and/or enables the message recommender and learning component 524 to obtain candidate messages).

The message recommender and learning component 524 may provide as output a summarized commit message that describes the code changes set by taking into account the description of the linked issue. The message recommender and learning component 524 may generate a commit message describing the code change set/group proposed by the group recommender and learning component 522 (e.g., recommended groups and messages 542). The message recommender and learning component 524 may learn from feedback from the user 530 in order to improve the quality of the generated messages and to learn user-preferences. The title and description of the identified issue can be used by the message recommender and learning component 524 to generate the commit message. In an additional embodiment, the message recommender and learning component 524 may provide/display to the user 530 the externally generated messages (which may be obtained and/or received from the and collects feedback.

In another aspect, corrected messages together with the code change set and metadata, may be used to train a deep learning model to generate messages, which may occur upon generating and collecting training data. The feedback of the user 530 may be used to learn how to correct externally generated messages (e.g., by learning a user's coding language preferences such as, for example, using the term "fix" instead of the term "repair"). The message recommender and learning component 524 may use the issue description to detect important entities and then use a template-based approach to generate appropriate commit messages.

In one aspect, the user 530 may receive, from the message recommender and learning component 524, 1) one or more groups of code changes, 2) associated messages, and/or 3) one or more links to corresponding issues in the issues tracking board (or the prompt to open a new issue). The user 530 may selected and provide (e.g., a final group of code changes and associated messages such as, for example, "final groups and messages 544") to an external versioning system 532: 1) one or more groups of code changes, 2) one or more corrected associated messages, and/or 3) one or more corrected links to corresponding issues in the issues tracking system 514 (or the prompt to open a new issue). The UI component for the user 530 may gather feedback 536 that is used to improve and/or personalize code group change results.

Figure 6:
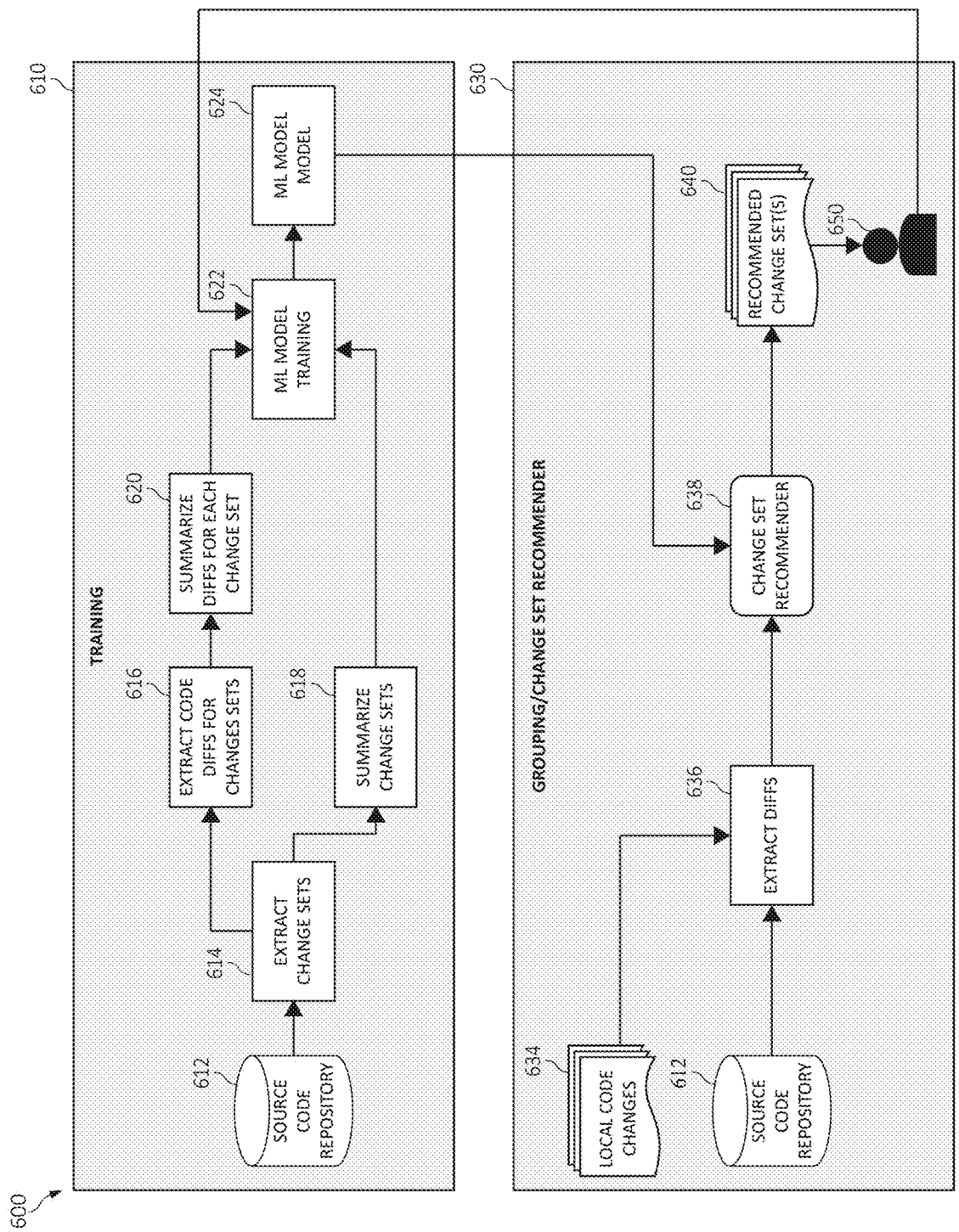
FIG. 6 is a diagram depicting operations for automatically generating logically consistent application code change groups in accordance with aspects of the present invention.

In view of FIGS. 4-5, FIG. 6 depicts additional system architecture for automatic generation of logically consistent application code change groups. As shown, the various blocks of functionality are depicted with arrows designating the blocks' 600 relationships with each other and to show process flow. Additionally, descriptive information is also seen relating each of the functional blocks 600. With the foregoing in mind, the module blocks 600 may also be incorporated into various hardware and software components of a system for automatic generation of logically consistent application code change groups methods and features in accordance with the present invention, such as those described in FIGS. 1-5. Many of the functional blocks 600 may execute as background processes on various components, either in distributed computing components, or on the user device, or elsewhere.

Starting in block 610, a training operation (for training a machine learning operation) may begin for automatic generation of logically consistent application code change groups. In block 614, one or more code change sets may be extracted from source code that may be received from a source code repository 612. The source code repository 612 may be a collection of one or more code changes performed on an application/software code (e.g., source code) by one or more application/software code developers and stored, maintained, and/or tracked in the source code repository 612.

In block 616, one or more code differences for the one or more change sets may be extracted. A summary may be provided for each of the differences for each code change set, as in block 620.

Additionally, in block 618, a summary may be provided for one or more of the code change sets. From both blocks 618 and 620, a machine learning model may be trained using the code change data, summary of the code changes, and/or feedback data received from a user 650, as in block 622. For example, a user may provide feedback to block 622 that identifies one or more selected ways of operations within an entity (e.g., a company) that is to be considered for training and/or retraining the machine learning model. One or more machine learning models may be generated, as in block 624 and provided to block 638 (e.g., the change set recommender 638) for grouping and/or change set recommender operations 630.

In block 634, a software developer may perform one or more code changes (e.g., local changes) on a source code. One or more code change differences 636 may be extracted by comparing a source code that may be received from a source code repository 612 with one or more local code changes 634 (e.g., local code changes made by a software developer prior to issuing a commit).

A change set recommender 638 may use the machine learning model, from block 624, will use the identified extracted differences to suggest one or more recommended change sets, as in block 640, and sent to user 650 for review and collection of feedback data. That is, the change set recommender 638 identifies what the software developer has changed to the local code and provides one or more alternative suggestions (using the machine learning models) that may be accepted, rejected, and/or modified by the user 650. The user 650 may analyze the or more recommended change sets (which are suggested based on using the machine learning model to build the one or more recommended change sets). Based on the analysis and one or more policies, preferences, and/or constraints, the user may provide feedback to block 622 to retrain the machine learning models.

To further illustrate, consider the following example. Assume that a software developer is part of a software development team that uses an issue tracking system to track the issues. At a specific point in time (e.g., in the morning), the software developer may have one or more issues in progress assigned to the software developer and there may always be issues in the backlog waiting to be selected. Assume that at a particular point in time (e.g., at the beginning of a work day) the software developer is working on the following issue in progress: Issue 1: refactor package "Maps."

While implementing this issue, the software developer discovers a small bug (added a null pointer check) and the software developer decided to immediately fix/repair the code bug. Then the software developer continues to work on the refactoring. At the end of the day, the software developer wants to commit his work.

Using the mechanisms of the illustrated embodiments described herein, each time the software developer makes a code changes, the present invention tracks the code changes that software developer is making. At the end of the work day, one or more logically consistent application code change groups may be committed together at a single point in time. For example, in this case, the present invention may suggest:

1) Group/commit 1—that includes one or more code changes related to the refactoring, and/or 2) Group/commit 2—that includes one or more code changes related to the bug fix.

Moreover, the present invention may link group 1 to issue 1 and suggest to the software developer to open a new issue for group 2, since the present invention is unable to identify/find a related issue (either in progress or in the backlog). The suggested groups/commits may be collected together with auto-generated summary messages that the software developer may modify, decline or accept.

Figure 7:
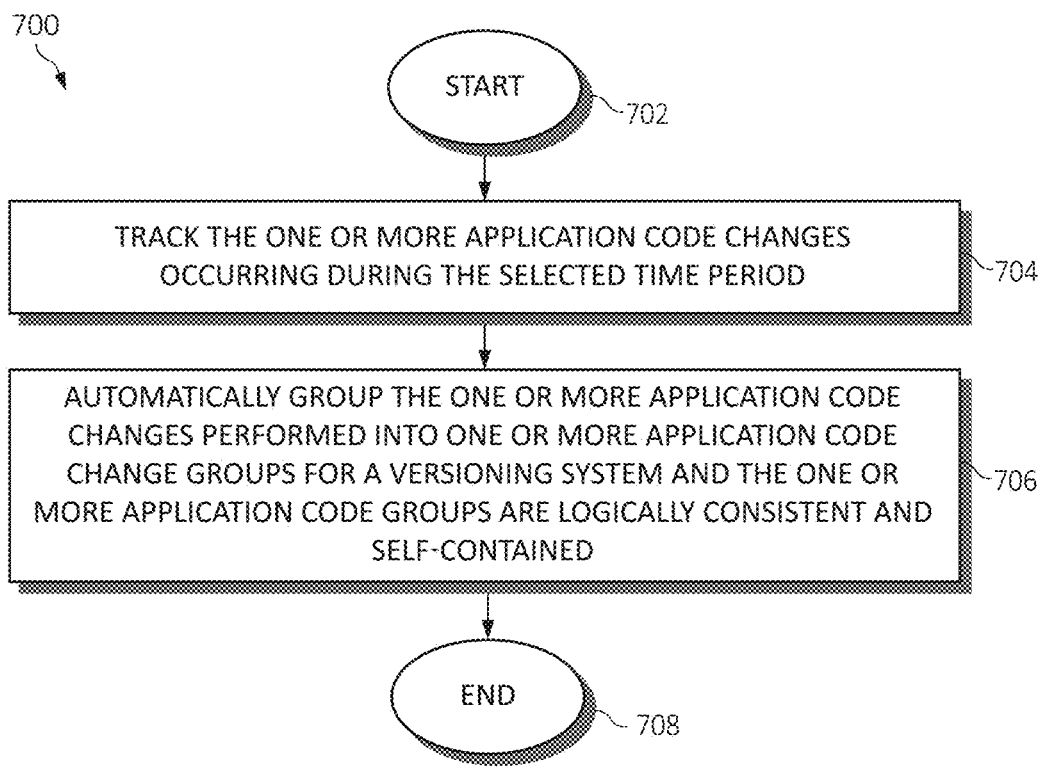
FIG. 7 is a flowchart diagram depicting an additional exemplary method for automatically generating logically consistent application code change groups in accordance with aspects of the present invention.

FIG. 7 is an additional flowchart diagram 700 depicting an additional exemplary method for providing intelligent application development, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

One or more application code changes occurring during the selected time period may be tracked, as in block 704. One or more application code changes may be automatically into one or more application code change groups for a versioning system, wherein the one or more application code groups are logically consistent and self-contained, as in block 706. The functionality 700 may end, as in block 708.

Figure 8:
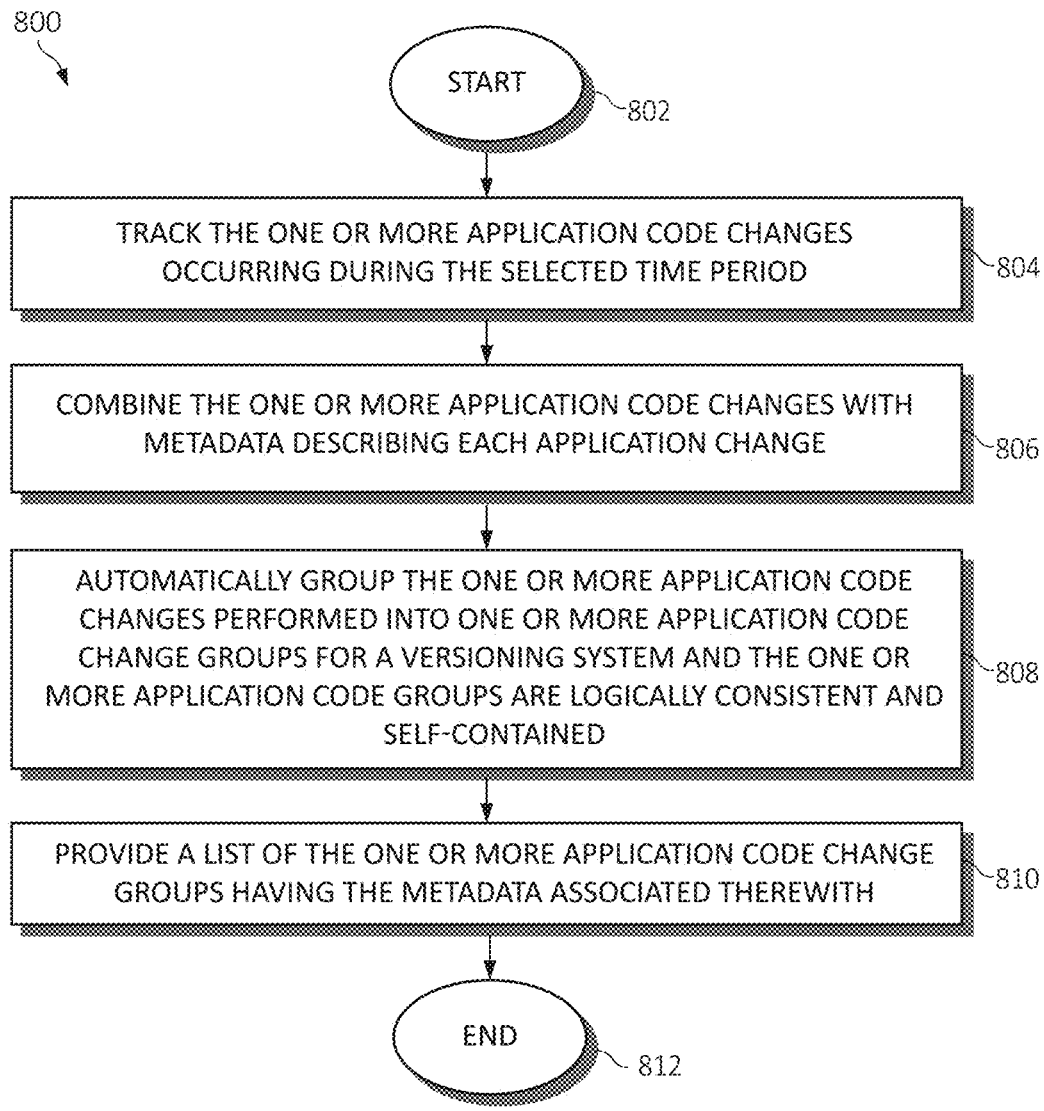
FIG. 8 is an additional flowchart diagram depicting an additional exemplary method for automatically generating logically consistent application code change groups in accordance with aspects of the present invention, again in which various aspects of the present invention may be realized.

FIG. 8 is an additional flowchart diagram 800 depicting an additional exemplary method for providing intelligent application development, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

One or more application code changes occurring during the selected time period may be tracked, as in block 804. The one or more application code changes may be combined with metadata describing each application change, as in block 806. One or more application code changes may be automatically into one or more application code change groups for a versioning system, wherein the one or more application code groups are logically consistent and self-contained, as in block 808.

A list of the one or more application code change groups having the metadata associated therewith may be provided (e.g., to a user via a graphical user interface "GUI"), as in block 810. The functionality 800 may end, as in block 812.

In one aspect, in conjunction with and/or as part of at least one block of FIGS. 7-8, the operations of methods 700 and/or 800 may include each of the following. The operations of methods 700 and/or 800 may automatically link each of the application code change groups to an existing issue or automatically link each of the application code change groups to a new issue.

The operations of methods 700 and/or 800 may combine the one or more application code changes with metadata describing each application change, and/or provide a list of the one or more application code change groups having the metadata associated therewith.

The operations of methods 700 and/or 800 may generate a message that describes the one or more application code change groups relating to an issue, and/or collect feedback data on the one or more application code change groups relating to the message.

The operations of methods 700 and/or 800 may initialize a machine learning mechanism to collect feedback data from a user, suggest the one or more application code change groups to a user for acceptance, denial, or modification, and/or learn to automatically group one or more application code changes into one or more application code change groups according to feedback data.

The operations of methods 700 and/or 800 may provide the message that describes the one or more application code change groups and/or may receive feedback data via an interactive graphical user interface (GUI) on one or more Internet of Things (IoT) devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing intelligent application development by a processor, comprising:
   continuously monitoring, by the processor, a local code base for one or more application code changes performed by a user;
   identifying, by the processor, one or more particular code changes, of the one or more application code changes related to a particular application issue, wherein the identifying occurs irrespective of whether the one or more particular code changes related to the particular application issue were sequentially performed;
   automatically grouping, by the processor, the one or more particular code changes into one or more application code change groups for a versioning system prior to commitment, wherein the one or more application code groups are logically consistent and self-contained;
   displaying, by the processor on a user interface, the one or more particular code changes in the one or more application code change groups as candidate changes for collective commitment;
   wherein the displaying includes automatically suggesting one or more of the one or more particular code changes within a particular group of the one or more application code change groups associated with the particular application issue be collectively committed while automatically suggesting others of the one or more application code changes identified as unrelated to the particular application issue be opened within a new group of the one or more application code change groups and associated with a suggested new application issue, wherein the displaying further includes automatically linking particular code change groups of the application code change groups to a new application issue currently open yet for which no application code changes have been made according to the identifying; and
   wherein the user selects the one or more application code change groups to commit.

2. The method of claim 1, wherein the continuously monitoring the local code base further includes tracking one or more code changes, of the one or more application code changes occurring during a selected time period.

3. The method of claim 1, wherein the automatically grouping and displaying the one or more particular code changes in the one or more application code change groups further includes:
   combining the one or more application code changes with metadata describing each of the one or more application code changes; and
   providing a list of the one or more application code change groups having the metadata associated therewith.

4. The method of claim 1, further including generating a message that describes the one or more application code change groups.

5. The method of claim 4, further including collecting feedback data on the one or more application code change groups described by the message.

6. The method of claim 5, further including initializing a machine learning mechanism to:
   collect the feedback data from the user;
   suggest the one or more application code change groups to the user for acceptance, denial, or modification when displaying the candidate changes; or
   learn to automatically group subsequent application code changes into subsequent application code change groups according to the feedback data.

7. A system for providing intelligent application development in a computing environment, comprising:
   one or more computers with executable instructions that when executed cause the system to:
   continuously monitor, by a processor associated with the one or more computers, a local code base for one or more application code changes performed by a user;
   identify, by the processor, one or more particular code changes, of the one or more application code changes related to a particular application issue, wherein the identifying occurs irrespective of whether the one or more particular code changes related to the particular application issue is sequentially performed;
   automatically group, by the processor, the one or more particular code changes into one or more application code change groups for a versioning system prior to commitment, wherein the one or more application code groups are logically consistent and self-contained;
   display, by the processor on a user interface, the one or more particular code changes in the one or more application code change groups as candidate changes for collective commitment;
   wherein the displaying includes automatically suggesting one or more of the one or more particular code changes within a particular group of the one or more application code change groups associated with the particular application issue be collectively committed while automatically suggesting others of the one or more application code changes identified as unrelated to the particular application issue be opened within a new group of the one or more application code change groups and associated with a suggested new application issue, wherein the displaying further includes automatically linking particular code change groups of the application code change groups to a new application issue currently open yet for which no application code changes have been made according to the identifying; and
   wherein the user selects the one or more application code change groups to commit.

8. The system of claim 7, wherein the continuously monitoring the local code base further includes tracking one or more code changes, of the one or more application code changes occurring during a selected time period.

9. The system of claim 7, wherein the automatically grouping and displaying the one or more particular code changes in the one or more application code change groups further includes:
- combining the one or more application code changes with metadata describing each of the one or more application code changes; and
- providing a list of the one or more application code change groups having the metadata associated therewith.

10. The system of claim 7, wherein the executable instructions further generate a message that describes the one or more application code change groups.

11. The system of claim 10, wherein the executable instructions further collect feedback data on the one or more application code change groups described by the message.

12. The system of claim 11, wherein the executable instructions further initialize a machine learning mechanism to:
- collect the feedback data from the user;
- suggest the one or more application code change groups to the user for acceptance, denial, or modification when displaying the candidate changes; and
- learn to automatically group subsequent application code changes into subsequent application code change groups according to the feedback data.

13. A computer program product for providing intelligent application development in a computing environment by a processor, the computer program product comprising a non-transitory computer-readable storage medium having computer-readable program code portions stored therein, the computer-readable program code portions comprising:
- an executable portion that continuously monitors, by the processor, a local code base for one or more application code changes performed by a user;
- an executable portion that identifies, by the processor, one or particular code changes, of the one or more application code changes, related to a particular application issue, wherein the identifying occurs irrespective of the one or more particular code changes related to the particular application issue is sequentially performed;
- an executable portion that automatically groups, by the processor, the one or more particular code changes into one or more application code change groups for a versioning system prior to commitment, wherein the one or more application code groups are logically consistent and self-contained;
- an executable portion that displays, by the processor on a user interface, the one or more particular code changes in the one or more application code change groups as candidate changes for collective commitment;
- wherein the displaying includes automatically suggesting one or more of the one or more particular code changes within a particular group of the one or more application code change groups associated with the particular application issue be collectively committed while automatically suggesting others of the one or more application code changes identified as unrelated to the particular application issue be opened within a new group of the one or more application code change groups and associated with a suggested new application issue, wherein the displaying further includes automatically linking particular code change groups of the application code change groups to a new application issue currently open yet for which no application code changes have been made according to the identifying; and
- wherein the user selects the one or more application code change groups to commit.

14. The computer program product of claim 13, wherein the continuously monitoring the local code base further includes tracking one or more code changes, of the one or more application code changes occurring during a selected time period.

15. The computer program product of claim 13, wherein the automatically grouping and displaying the one or more particular code changes in the one or more application code change groups further includes:
- combining the one or more application code changes with metadata describing each of the one or more application code changes; and
- providing a list of the one or more application code change groups having the metadata associated therewith.

16. The computer program product of claim 13, further including an executable portion that:
- generates a message that describes the one or more application code change groups; and
- collects feedback data on the one or more application code change groups described by the message.

17. The computer program product of claim 16, further including an executable portion that initializes a machine learning mechanism to:
- collect the feedback data from the user;
- suggest the one or more application code change groups to the user for acceptance, denial, or modification when displaying the candidate changes; and
- learn to automatically group subsequent application code changes into subsequent application code change groups according to the feedback data.

* * * * *